United States Patent [19]

Grenlund

[11] 4,360,771
[45] Nov. 23, 1982

[54] ON-MACHINE BATTERY RECHARGING SYSTEM

[75] Inventor: Wesley F. Grenlund, Clinton, Wis.

[73] Assignee: Beloit Corporation, Beloit, Wis.

[21] Appl. No.: 87,412

[22] Filed: Oct. 22, 1979

[51] Int. Cl.³ .................... H02J 7/00; H02K 21/12; H02K 11/00

[52] U.S. Cl. .................................. 320/61; 310/74; 310/68 R; 310/153; 310/156

[58] Field of Search ............ 320/2, 61; 310/36, 68 B, 310/68 C, 68 R, 75, 152–156, 74; 322/3, 100; 58/204, 205, 206

[56] References Cited

U.S. PATENT DOCUMENTS

| | | | |
|---|---|---|---|
| 3,005,305 | 10/1961 | Thoma | 368/158 |
| 3,480,811 | 11/1969 | Grosbard | 310/156 |
| 3,497,026 | 2/1970 | Calvert | 320/61 X |
| 3,792,742 | 2/1974 | Mager | 320/61 X |
| 3,962,911 | 6/1976 | Grenlund | 73/764 |
| 4,008,566 | 2/1977 | McClintock | 320/21 X |
| 4,229,728 | 10/1980 | Tremba | 310/74 X |

FOREIGN PATENT DOCUMENTS 7,710,239  7/1979  Sweden ................. 320/61

Primary Examiner—R. J. Hickey
Attorney, Agent, or Firm—Hill, Van Santen, Steadman, Chiara & Simpson

[57] ABSTRACT

Battery charging apparatus, and the battery to be charged, are mounted on the end face of a rotating roll. In one embodiment stationary magnets are mounted adjacent the paths of travel of ferrite rods which carry electrical windings. In another embodiment a hollow torus carrying an electrical winding is mounted concentric of the axis of rotation of the roll and has a freely-falling magnet therein. In another embodiment the torus is replaced by a plurality of hollow elongate carriers each carrying a winding and each having a freely-falling magnet therein.

10 Claims, 4 Drawing Figures

ON-MACHINE BATTERY RECHARGING SYSTEM

BACKGROUND OF THE INVENTION

1. Field of the Invention

This invention relates to battery charging apparatus, and is more particularly concerned with charging a battery carried on a rotating device.

2. Description of the Prior Art

Battery-powered circuits are employed for monitoring, testing and the like for apparatus which operates with an alternating motion, such as large rotating machinery. An example of such an application is disclosed in my U.S. Pat. No. 3,962,911 in which a strain gauge is carried on the inner surface of a large rotating roll of a paper machine and the sensed strain is converted into an electrical signal and transmitted as an optical signal from the roll. In this system it is necessary to provide a battery on the rotating roll to power the electronic circuits. With systems of this type it is necessary to shut down the machinery in order to chain or recharge the battery.

The most pertinent prior art which has come to my attention with respect to the present invention is U.S. Pat. No. 3,840,297 to Shoupp et al in which a spring-loaded magnet is fired, upon release of the spring, through a coil to induce a voltage therein for a predetermined time to fire a photoflash lamp.

SUMMARY OF THE INVENTION

It is the object of the present invention to provide an on-machine battery charging apparatus and thereby obviate the necessity of and eliminate machine down time for the purpose of replacing or recharging batteries.

The above object is achieved, on a rotating roll, by electrically connecting a rectifier to the battery and mounting the rectifier, along with the battery, on the end face of a rotatable roll. At least one electrical winding is connected to the rectifier and mounted on the end face of the roll for movement relative a permanent magnet so as to have voltages induced therein to charge the battery via the rectifier.

In one embodiment of the invention, the windings are carried on ferrite cores mounted on the roll and permanent magnets are affixed to a stationary support and positioned adjacent the paths of rotation of the ferrite cores.

In another embodiment of the invention, a hollow torus is carried on the end face of the roll coaxially with the axis of rotation and carries an electrical winding thereon which is connected to the rectifier. A permanent magnet is freely movable within the hollow torus so as to be in a constant free fall condition during rotation of the roll and thereby induce the voltages into the electrical winding.

In another embodiment of the invention, the winding and its carrier are divided into a plurality of windings and carriers, for example four, and mounted spaced apart and radially outward of the axis of rotation of the roll. Each hollow carrier has a magnet mounted therein for free fall and the ends of each carrier are closed and provided with resilient stops for the magnet.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
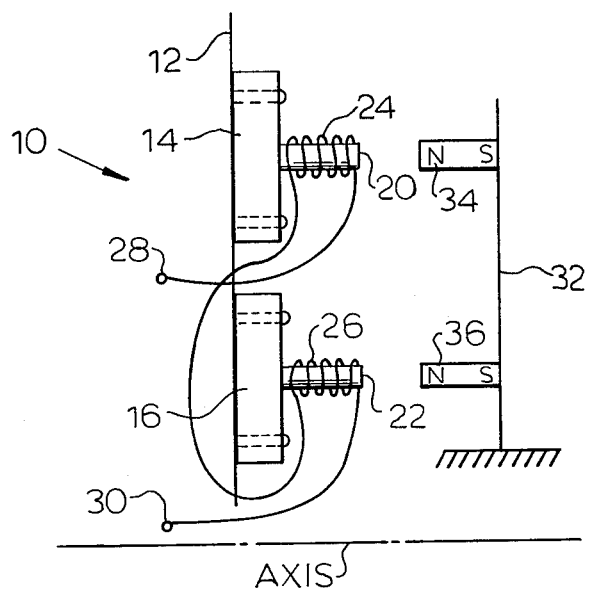
FIG. 1 is a diagrammatic illustration showing, in a side view, a pair of ferrite cores each carrying an electrical winding and mounted on the end face of the roll for rotation past a pair of corresponding permanent magnets.

Referring to FIG. 1, a first embodiment of the invention is generally illustrated at 10 as comprising an end face of a roll which is mounted for rotation about an axis and which carries a pair of supports 14 and 16 secured thereto, as by a plurality of machine screws 18. The support 14 carries a ferrite core 20, while the support 16 carries a ferrite core 22. The ferrite cores 20 and 22 have respective electrical windings 24 and 26 thereon which are adapted at 28 and 30 for connection to a rectifier (not shown). A pair of permanent magnets 34 and 36 are fixedly mounted, as symbolically illustrated at 32, immediately adjacent the paths of rotation of the ferrite cores 20 and 22 and their windings 24 and 26. The relative rotation induces voltages in the coils 24 and 26 for rectification by the rectifier and subsequent charging of the battery connected to the rectifier (also not shown).

Figure 2:
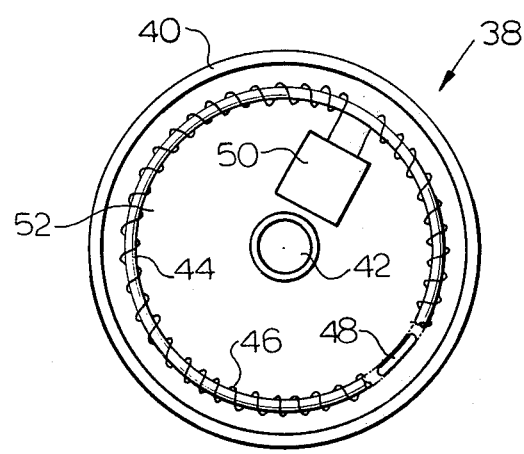
FIG. 2 is an end view of a roll illustrating a second embodiment of the invention in which an electrical winding is carried on a torus concentric with the axis of rotation, the torus being hollow and provided with a freely movable permanent magnet therein.

Referring to FIG. 2, a second embodiment of the invention is generally illustrated at 38 as applied to the roll 40 which is mounted for rotation about an axis 42. Here, a continuous hollow tube 44 is secured to the end face 52 of the roll 40 and has an electrical winding 46 wound thereabout over the entire length of the tube 44, the winding being connected to charge a battery via a rectifier, here jointly indicated at 50. A permanent magnet 48 is freely movable within the tube 44, generally in a free fall fashion, and slides within the tube so that there is relative movement between the magnet 48 and the winding 46 and a voltage is continuously induced in the winding 46 and applied to the rectifier.

Figure 3:
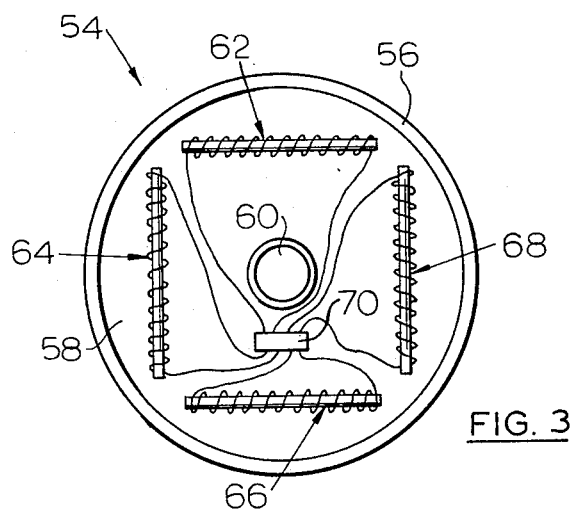
FIG. 3 is an end view of a roll illustrating another embodiment of the invention in which the electrical winding and carrier are provided in multiple and mounted spaced from each other and from the axis of rotation of the roll.
Figure 4:
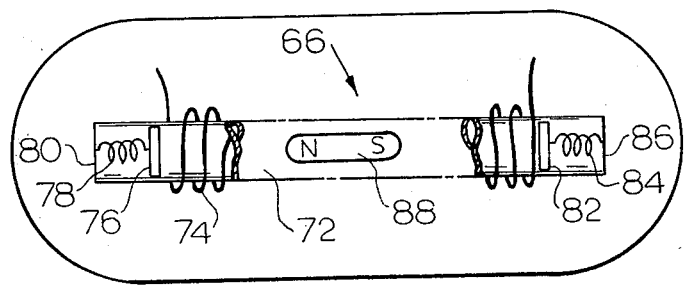
FIG. 4 illustrates, in a partial sectional view, a coil, carrier and permanent magnet for use in the apparatus of FIG. 3, the carrier being fitted with a pair of spring-loaded end stops.

In order to avoid the problem of centrifugal effects, particularly where a high-speed rotation is employed, the continuous carrier and winding of FIG. 2 has been divided in FIGS. 3 and 4 which illustrate a further embodiment of the invention.

In FIG. 3 this embodiment is generally illustrated at 54 as comprising, on a roll 56 which has an end plate 58 and which is rotatable about an axis 60, a plurality of hollow carrier-winding structures 62–68, each of which is connected to a rectifier and battery pack 70. The elements 62–68 are identical and the structure thereof is best seen in FIG. 4. In FIG. 4, the carrier-winding element 66 is illustrated as comprising a hollow tube 72 which has an electrical winding 74 carried thereon. Within the tube is a magnet 88 which operates in a free fall fashion upon rotation of the tube toward the vertical. Each of the tube ends 80, 86 are closed and have respective coil springs 78, 84 bearing thereagainst; and each of the coil springs 78, 84 has a respective pad 76, 82 bearing thereagainst for engaging the falling magnet 88. As with the embodiment of FIG. 2, the relative movement between the magnet 88 and the winding 74 induces voltages in the winding for rectification and battery charging.

Although I have described my invention by reference to particular illustrative embodiments thereof, many changes and modifications of the invention may become apparent to those skilled in the art without departing from the spirit and scope of the invention. For example any element which may cause a medium to move in such a manner that an electrical winding can be coupled to the medium and connected to a rectifier-battery circuit may be employed in practicing the present invention, such as ocean waves, wind and the like, which one may wish to monitor. I therefore intend to include within the patent warranted hereon all such changes and modifications as may reasonably and properly be included within the scope of my contribution to the art.

I claim:

1. In a system of the type in which a battery is mounted on a continuously rotating roll for powering electrical apparatus, the improvement therein of battery charging apparatus comprising:
   a rectifier mounted on the roll and electrically connected to the battery;
   coil means mounted on the roll and electrically connected to said rectifier, said coil means comprising a hollow torus mounted on the continuously rotating roll concentric with the axis of rotation of the roll and a winding carried on said torus and electrically connected to said rectifier; and
   a permanent magnet disposed freely movable in said torus for continuous free-fall action during rotation of the roll for relative movement with respect to said winding for inducing an electrical voltage in said winding.

2. In a system of the type in which a battery is mounted on a rotating roll for powering electrical apparatus, the improvement therein of battery charging apparatus comprising:
   a rectifier mounted on the roll and electrically connected to the battery;
   coil means mounted on the roll and electrically connected to said rectifier, said coil means comprising at least one ferrite core mounted on the roll and a winding carried on said ferrite core and connected to said rectifier; and
   magnet means mounted for relative movement with respect to said coil means for inducing an electrical voltage in said coil means, said magnet means comprising a magnet fixedly mounted off the roll at a position at which said coil means rotates through its magnetic field.

3. In a system of the type in which a battery is mounted on a rotating roll for powering electrical apparatus, the improvement therein of battery charging apparatus comprising:
   a rectifier mounted on the roll and electrically connected to the battery;
   coil means mounted on the roll and electrically connected to said rectifier, said coil means comprising a plurality of carriers mounted on the roll spaced apart from each other and from the axis of rotation of the roll, and a plurality of windings, each of said windings carried on a respective carrier and each connected to said rectifier, each of said carriers comprising a hollow tube with closed ends; and
   magnet means mounted for relative movement with respect to said coil means for inducing an electrical voltage into said coil means, said magnet means comprising a plurality of permanent magnets each freely movable within a respective tube.

4. The improved system of claim 3, wherein each of said hollow tubes comprises:
   a pair of spring-loaded stops each disposed at a respective end of the tube to resiliently engage said magnet.

5. The improved system of claim 4, wherein each of said stops comprises:
   a pad; and
   a coil spring between the end of the tube and said pad.

6. A combination comprising:
   a roll mounted for rotation about an axis and including an end face;
   a battery and a rectifier electrically connected thereto, said battery and rectifier mounted on said end face;
   a plurality of hollow elongate closed end tubes mounted spaced apart from each other and spaced from the axis of rotation on said end face, each including a resilient stop at each of its ends;
   a plurality of permanent magnets each disposed for free fall within a respective tube; and
   a plurality of electrical windings connected to said rectifier and carried on respective tubes for receiving induced voltages in response to magnet free fall to charge said battery.

7. The combination of claim 6, wherein:
   each of said electrical windings is wound about and extends substantially the length of the respective tube.

8. The combination of claim 6, wherein each of said resilient stops comprises:
   a coil spring bearing against a closed end; and
   a pad bearing against said spring.

9. A combination comprising:
   a roll mounted for rotation about an axis and including an end face;
   a battery and a rectifier electrically connected thereto, said battery and rectifier mounted on said end face;
   a hollow tube mounted coaxially about the axis of rotation of said roll on said end face;
   a permanent magnet disposed for free fall within said hollow tube; and
   an electrical winding connected to said rectifier and carried on said tube for receiving induced voltages in response to magnet free fall to charge said battery.

10. A combination comprising:
    a roll mounted for rotation about an axis and including an end face;
    a battery and a rectifier electrically connected thereto, said battery and rectifier mounted on said end face;
    a plurality of ferrite cores mounted spaced apart from each other and spaced from the axis of rotation on said end face;

a plurality of permanent magnets each stationarily disposed adjacent the path of rotation of a respective ferrite core; and a plurality of electrical windings connected to said rectifier and carried on respective ferrite cores for receiving induced voltages in response to relative rotation between the magnets and the ferrite cores to charge said battery.

* * * * *